(12) United States Patent
Kang

(10) Patent No.: US 11,768,598 B2
(45) Date of Patent: Sep. 26, 2023

(54) DEVICE HAVING A DISPLAY AND CONTROL METHOD FOR OBTAINING OUTPUT LAYOUT OF INFORMATION ON THE DISPLAY

(71) Applicant: Samsung Electronics Co., Ltd., Suwon-si (KR)

(72) Inventor: Hyunho Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 17/249,038

(22) Filed: Feb. 18, 2021

(65) Prior Publication Data

US 2021/0255766 A1    Aug. 19, 2021

(30) Foreign Application Priority Data

Feb. 18, 2020    (KR) .................. 10-2020-0019761

(51) Int. Cl.
*G06F 3/04886*    (2022.01)
*G04G 9/02*    (2006.01)
(Continued)

(52) U.S. Cl.
CPC ......... *G06F 3/04886* (2013.01); *G04G 9/027* (2013.01); *G04G 99/006* (2013.01);
(Continued)

(58) Field of Classification Search
None
See application file for complete search history.

(56) References Cited

U.S. PATENT DOCUMENTS 6,760,048 B1 * 7/2004 Bates ................... G06F 3/0481
715/781
10,175,866 B2    1/2019 Block et al.
(Continued)

FOREIGN PATENT DOCUMENTS

KR    10-2010-0043991 A    4/2010
KR    10-2018-0095008 A    8/2018
(Continued)

OTHER PUBLICATIONS

Huculak, "How to change date and time formats on Windows 10," Dec. 30, 2016, https://www.windowscentral.com/ how-change-date-and-time-formats-windows-10.*
(Continued)

*Primary Examiner* — Ryan Barrett

(57) ABSTRACT

A device is disclosed. The device includes a display, a memory configured to store an artificial intelligence model trained to obtain an output layout information of an additional information provided in the device, and a processor connected to the display and the memory. The processor is configured to control the device, and obtain, based on an output layout of the main information provided in the device being selected, an output layout information of the additional information by inputting information related to an output layout of a main information to the artificial intelligence model. The processor is also configured to control the display to output a user interface (UI) screen including time information and additional information based on an output layout of the main information and an output layout information of the additional information.

20 Claims, 11 Drawing Sheets

(51) Int. Cl.
  *G06F 3/0482* (2013.01)
  *G06N 20/00* (2019.01)
  *G06N 3/08* (2023.01)
  *G06F 3/04817* (2022.01)
  *G06F 11/34* (2006.01)
  *G04G 99/00* (2010.01)
  *G06F 1/16* (2006.01)

(52) U.S. Cl.
  CPC ............ *G06F 1/163* (2013.01); *G06F 3/0482* (2013.01); *G06F 3/04817* (2013.01); *G06F 11/3438* (2013.01); *G06N 3/08* (2013.01); *G06N 20/00* (2019.01)

(56) References Cited

U.S. PATENT DOCUMENTS

| | | | |
|---|---|---|---|
| 10,268,432 B2 | 4/2019 | Kyung | |
| 10,304,347 B2 | 5/2019 | Wilson et al. | |
| 10,353,549 B2 | 7/2019 | Azmoon | |
| 10,365,811 B2 | 7/2019 | Robinson et al. | |
| 10,965,622 B2 * | 3/2021 | Kim | H04L 51/046 |
| 11,620,692 B2 * | 4/2023 | Dueskar | G06Q 30/0621 |
| | | | 705/26.5 |
| 2009/0210820 A1 * | 8/2009 | Adachi | G06F 3/0481 |
| | | | 715/788 |
| 2011/0148917 A1 * | 6/2011 | Alberth, Jr | G09G 5/14 |
| | | | 345/629 |
| 2012/0017177 A1 * | 1/2012 | Kim | G06F 3/04886 |
| | | | 715/828 |
| 2012/0036468 A1 * | 2/2012 | Colley | G06F 3/04186 |
| | | | 715/773 |
| 2013/0002560 A1 * | 1/2013 | Chen | G06F 3/0488 |
| | | | 345/173 |
| 2013/0019191 A1 * | 1/2013 | Arnold | G06F 3/04886 |
| | | | 715/765 |
| 2014/0098069 A1 * | 4/2014 | Tseng | G06F 3/0238 |
| | | | 345/178 |
| 2014/0164973 A1 * | 6/2014 | Greenzeiger | G06F 3/0233 |
| | | | 715/773 |
| 2014/0232739 A1 * | 8/2014 | Kim | G09G 5/14 |
| | | | 345/592 |
| 2014/0372921 A1 * | 12/2014 | Efrati | G06F 3/0484 |
| | | | 715/766 |
| 2015/0105125 A1 | 4/2015 | Min et al. | |
| 2016/0054710 A1 | 2/2016 | Jo et al. | |
| 2016/0092428 A1 * | 3/2016 | Ilic | G06F 3/04847 |
| | | | 715/765 |
| 2016/0163052 A1 * | 6/2016 | Kim | G06V 10/273 |
| | | | 715/766 |
| 2016/0372083 A1 * | 12/2016 | Taite | G06F 3/04886 |
| 2016/0380851 A1 * | 12/2016 | Kosai | G06F 16/24578 |
| | | | 715/735 |
| 2017/0003710 A1 | 1/2017 | MacWilliams et al. | |
| 2017/0322908 A1 | 11/2017 | Ni et al. | |
| 2018/0299836 A1 | 10/2018 | Qian et al. | |
| 2019/0042071 A1 * | 2/2019 | Gandhi | H04L 67/535 |
| 2019/0121300 A1 | 4/2019 | Peterson et al. | |
| 2019/0243883 A1 * | 8/2019 | Vangen | H04L 67/02 |
| 2020/0021954 A1 | 1/2020 | Lee et al. | |
| 2020/0133444 A1 * | 4/2020 | Hou | G06F 16/906 |
| 2020/0257364 A1 * | 8/2020 | Strandberg | G06F 3/0482 |
| 2020/0265337 A1 * | 8/2020 | Mutalik | G06F 16/908 |
| 2020/0409724 A1 * | 12/2020 | DiMascio | G06F 8/36 |
| 2021/0232273 A1 * | 7/2021 | Gupta | G06F 3/0482 |
| 2022/0334686 A1 * | 10/2022 | Kruzick | G06F 9/453 |

FOREIGN PATENT DOCUMENTS

| | | |
|---|---|---|
| KR | 10-1902864 B1 | 10/2018 |
| KR | 10-2019-0082578 A | 7/2019 |

OTHER PUBLICATIONS

International Search Report and Written Opinion of the International Searching Authority in connection with International Application No. PCT/KR2021/001806 dated Jun. 2, 2021, 7 pages.

* cited by examiner

DEVICE HAVING A DISPLAY AND CONTROL METHOD FOR OBTAINING OUTPUT LAYOUT OF INFORMATION ON THE DISPLAY

CROSS-REFERENCE TO RELATED APPLICATION

This application is based on and claims priority under 35 U.S.C. § 119 to Korean patent application number 10-2020-0019761, filed on Feb. 18, 2020, in the Korean Intellectual Property Office, the disclosure of which is incorporated by reference herein in its entirety.

BACKGROUND

1. Field

This disclosure relates to a device and a control method thereof and more particularly, to a device that provides time information and a control method thereof.

2. Description of Related Art

With the development of electronic technology, a variety of electronic devices are under development and being supplied. Recently, wearable devices of various types are being developed and supplied to meet the needs of users desiring newer and more variety in function.

Even among the wearable devices of various types, smart watches, in particular, are being actively supplied more than other wearable devices for reasons such as convenience in wear, or the like.

Unlike wrist watches and electronic watches according to the related art, smart watches that are recently developed and supplied do not stop at simply providing time information, but provide a variety of information. For example, the smart watch may provide additional information such as heart rate, number of steps taken, and messenger notifications in addition to the time information.

However, because a user interface (UI) that provides this additional information requires development by third party developers, there may be a problem of multiple limiting conditions existing in order to easily add and display additional information that meets the needs of the user.

SUMMARY

An aspect of this disclosure is to provide a smart watch device providing various additional information other than time information, and a control method thereof.

According to an embodiment, a device includes a display, a memory configured to store an artificial intelligence model trained to obtain an output layout information of an additional information provided in the device, and a processor connected to the display and the memory and configured to control the device, and the processor is configured to obtain, based on an output layout of main information provided in the device being selected, an output layout information of the additional information by inputting information related to an output layout of the main information to the artificial intelligence model, and control the display to provide a UI screen comprising the main information and the additional information based on an output layout of the main information and an output layout information of the additional information.

According to an embodiment, a control method of a device including an artificial intelligence model trained to obtain an output layout information of an additional information provided in the device, the method includes obtaining, based on an output layout of a main information provided in the device being selected, an output layout information of the additional information by inputting information related to an output layout of the main information to the artificial intelligence model, and providing a UI screen including the main information and the additional information based on an output layout of the main information and an output layout information of the additional information.

According to the various embodiment of the disclosure as described above, an output layout of a time information, for example a watch face, may be freely set according to a user selection.

In addition, additional information which is appropriately modified and customized to a selected output layout and additional information may be provided to a user without development and generation of a 3rd party developer.

In addition, additional information considering a user history of a parent terminal such as an external user terminal may be provided to a user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
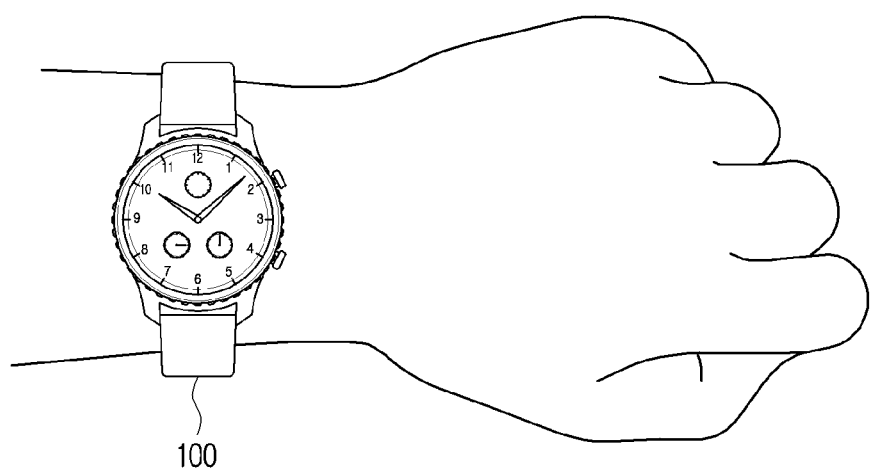
FIG. 1 illustrates a diagram of an example device according to this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The disclosure will be explained in greater detail below with reference to the attached drawings.

The terms used in the embodiments of the disclosure are general terms identified in consideration of the functions in the disclosure. However, these terms may vary depending on intention, legal or technical interpretation, emergence of new technologies, and the like of those skilled in the related art. Also, there may be some terms arbitrarily identified by an applicant, and in this case the meaning thereof will be described in detail in the description part of the corresponding disclosure. Accordingly, the terms used herein may be construed, not simply by their designations, but based on the meaning of the term and the overall content of the disclosure.

Expressions such as "comprise," "may comprises," "include," or "may include" and the like used herein may designate a presence of a characteristic (e.g., element such as number, function, operation, or component), and not preclude a presence of other characteristics.

The expression at least one from A and/or B is to be understood as indicating at least one of "A" or "B" or "A and B."

Expressions such as "first," "second," "1st," "2nd," or so on used in the disclosure may modify various elements regardless of order and/or importance, and may be used only to distinguish one element from another, but not to limit the corresponding elements.

When a certain element (e.g., first element) is indicated as being "(operatively or communicatively) coupled with/to" or "connected to" another element (e.g., second element), it may be understood as the certain element being directly coupled with/to the other element or as being coupled through another element (e.g., third element).

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components, or a combination thereof.

The terms "module" or "part" used in the embodiments herein perform at least one function or operation, and may be implemented as a hardware or software, or a combination of hardware and software. Further, a plurality of "modules" or a plurality of "parts", except for a "module" or a "part" which needs to be implemented to a specific hardware, may be integrated to at least one module and implemented in at least one processor (not shown).

In this disclosure, the term "user" may refer to a person using an electronic device or a device (e.g., artificial intelligence electronic device) using an electronic device.

The disclosure will be described in greater detail below with reference to the accompanied drawings.

FIG. 1 illustrates a diagram of an example device according to an embodiment.

FIG. 1 is a diagram for describing an implementation form of the device according to an embodiment of the disclosure. The device may include a wearable device and a portable device of various types. For example, the device may be implemented as a smart watch device 100. The smart watch device 100 may refer to an electronic device capable of performing various functions which are improved than an average watch.

FIG. 1 has been illustrated assuming the smart watch device 100, but the various embodiments of the disclosure may be implemented through a wearable device and portable devices of various forms. The wearable device may be comprised of a flexible material (e.g., silicon rubber), and refer to a device that is wearable by a user. For example, devices of various types such as, for example, and without limitation a watch, clothes, shoes, gloves, glasses, a hat, accessories (e.g., ring), or the like which are wearable on the body of a human or animal. For convenience of description, the smart watch device 100 wearable on the wrist will be described below.

The smart watch device 100 may refer to an embedded system wrist watch mounted with improved functions than an average watch. The smart watch device 100 may drive a mobile application. In addition, the smart watch device 100 may include a mobile media player function such as a communication function, an audio or video file playback function, and the like, and may output a sound signal to an external device (e.g., headset) through a Bluetooth function. In addition, based on the service provided, the smart watch device 100 may receive download of data, and transmit the data to a web browser. In addition, the smart watch device 100 may be implemented to draw a pre-set pattern in an initial state or release a lock state through a signature. That is, the smart watch device 100 may be implemented so that most of the implementable functions in the user terminal device (not shown; e.g., smart phone) according to the related art is executable.

The smart watch device 100 may largely be divided to a stand-alone smart watch and an interlocking smartwatch. The smart watches may commonly include a camera, an accelerometer, a thermometer, an altimeter, a barometer, a compass, a chronograph, a calculator, a cellular phone, a touch screen, a global positioning system (GPS), a display map, an information graphic, a computer speaker, a calendar function, a wrist watch, a secure digital (SD) card capacity device recognition function, a rechargeable battery, and the like. The stand-alone smart watch, unlike the interlocking smart watch, may include self-communication functions such as a wireless headset, a microphone, a call/data modem, a subscriber identification module (SIM) card slot, or the like so that it may be used independently. Although the interlocking smart watch may be advantageous in that interlocking with the smart phone has been made convenient thereby making synchronization convenient, but there may be the disadvantage of having to connect with the smartphone through Bluetooth for proper use. In the disclosure, the stand-alone watch has been assumed and described, but the technical ideal according to the disclosure may be modified to a form applicable even to an interlocking smart watch and applied.

The device according to the various embodiments of the disclosure may be implemented to a device of various types such as, for example, and without limitation, a user terminal device, a display device, a set-top box, a tablet personal computer (tablet PC), a smart phone, an e-book reader, a desktop PC, a laptop PC, a workstation, a server, a personal digital assistant (PDA), a portable multimedia player (PMP), an MP3 player, a Kiosk, or the like in addition to a wearable device such as a smart watch device. In addition, the various embodiments of the disclosure may also be implemented in devices of various types other than the wearable device.

Figure 2:
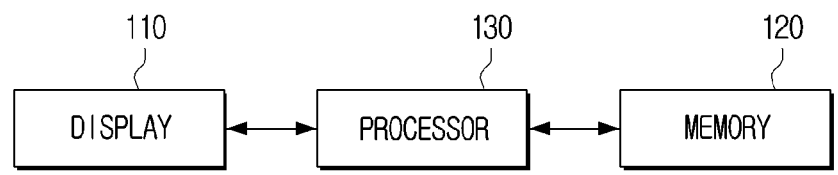
FIG. 2 illustrates a block diagram of an example configuration of a device according to this disclosure.

FIG. 2 illustrates a block diagram of an example configuration of a smart watch device according to an embodiment.

Referring to FIG. 2, the smart watch device 100 according to an embodiment of the disclosure may include a display 110, a memory 120, and a processor 130.

The display 110 may be implemented as a display including an emissive device or a display including a non-emissive device and a backlight. For example, the display may be implemented to a display of various types such as, for example, and without limitation, a liquid crystal display (LCD), an organic light emitting diode (OLED) display, light emitting diodes (LED), a micro LED, a mini LED, a plasma display panel (PDP), a quantum dot (QD) display, a quantum dot light emitting diodes (QLED), or the like. In the display 110, a driving circuit, which may be implemented in the form of an a-si TFT, a low temperature poly silicon (LTPS) TFT, an organic TFT (OTFT), a backlight unit, and the like may be included. The display 110 may be implemented as a touch screen coupled with a touch sensor, a flexible display, a rollable display, a third-dimensional display (3D display), a display physically coupled with a plurality of display modules, or the like.

In addition, according to an embodiment of the disclosure, the display 110 may include not only a display panel for outputting an image, but also a bezel for housing the display panel. According to an embodiment of the disclosure, the bezel may include a touch sensor (not shown) for detecting a user interaction.

The display 110 according to an embodiment of the disclosure may provide main information according to a control of the processor 130. The main information may refer to main information provided through the device. For example, if the device is implemented as a smart watch device 100, the main information provided through the smart watch device 100 may refer to time information. The time information may refer to current time corresponding to a current location, current time of a set country, a stop watch function, time passed according to a timer function, and the like. In another example, if the device is implemented as a display device, the main information provided through the display device may refer to content (e.g., moving image, still image, etc.) of various types.

The display 110 may display the main information based on an output layout of the main information according to the control of the processor 130. For example, if the device is implemented as a smart watch device 100, the smart watch device 100 may display time information based on the output layout of time information. The output layout of the time information may refer to a background screen (e.g., watch face, theme of a smart watch device) of the smart watch device 100. The output layout of the time information may include at least one from among a background image, a plurality of objects or type information.

The plurality of objects may include a text, a shape, an indicator, a figure, an image, and the like. In addition, the plurality of objects may include information on at least one from among a form, size or color of each of an hour hand, a minute hand, and a second hand to provide time information.

The type information included in the output layout of the time information may include an analog type information or a digital type information. According to an embodiment, based on the output layout of the time information being an output layout of the analog form, the display 110 may display the time information in analog form according to the control of the processor 130. In another example, based on the output layout of the time information being an output layout of the digital form, the display 110 may display the time information in digital form according to the control of the processor 130.

The above-described embodiment is merely one working example, and is not limited thereto. For example, the device 100 may be implemented as an air conditioner, and the device 100 may provide an indoor temperature, an indoor humidity, a desired temperature, desired humidity, or the like according to the driving of the air conditioner as main information based on the output layout of the main information. Below, the device is described as being implemented as a smart watch device 100, and the main information is described as being time information for convenience of description.

The memory 120 may be a configuration for variably storing various information related to the function of the smart watch device 100. The memory 120 may be implemented as a non-volatile memory such as, for example, and without limitation, a hard disk, a solid-state drive (SDD), a flash memory (e.g., a NOR type flash memory, NAND type flash memory, etc.), or the like.

The memory 120 may be stored with one or more artificial intelligence models. In the memory 120 according to an embodiment of the disclosure, the artificial intelligence model trained to obtain output layout information of the additional information provided in the smart watch device 100 may be stored. In an example, the processor 130 may input information related to the output layout of the time information to the artificial intelligence model and obtain output layout information of the additional information. The detailed description on the additional information and the output layout information of the additional information will be described below.

The artificial intelligence model according to an embodiment may, as a determining model trained based on a plurality of images based on an artificial intelligence algorithm, be a model based on a neural network. The trained determining model may be designed to simulate the human brain structure on a computer, and include a plurality of network nodes having weighted value that may simulate a neuron of a human neural network. The plurality of network nodes may each establish a connection relationship so that the neurons simulate synaptic activity of sending and receiving signals through the synapse. In addition, the trained determining model may, in an example, include a machine learning model, a neural network model or a deep learning model developed from the neural network model. In the deep learning model, a plurality of network nodes may be located at different depths (or, layers), and may send and receive data according to a convolution connection relationship.

The artificial intelligence model according to an embodiment may be a determining model trained based on the output layout of a plurality of the time information based on an artificial intelligence algorithm. For example, the artificial intelligence model stored in the memory 120 may be an artificial intelligence model trained based on the background image, the plurality of objects or type information according to the output layout of the time information and trained to output the output layout of the additional information.

In an example, the artificial intelligence model may be a convolution neural network (CNN) trained based on an image. The CNN may be a multi-layered neural network having a special connection structure designed to perform speech processing, image processing, and the like. The artificial intelligence model may not be limited to the CNN. For example, the artificial intelligence model may be implemented as a deep neural network (DNN) of at least one from among a recurrent neural network (RNN), a long short term memory network (LSTM), gated recurrent units (GRU), or generative adversarial networks (GAN).

The processor 130 may control the overall operation of the electronic device 100.

The processor 130 according to an embodiment may be implemented as a digital signal processor (DSP), a microprocessor, an artificial intelligence (AI) processor, a time controller (TCON) that processes a digital image signal, or the like. However, the embodiment is not limited thereto, and may include, for example, and without limitation, one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 130 may be implemented as a System on Chip (SoC) or large scale integration (LSI) embedded with a processing algorithm, and may be implemented in the form of a field programmable gate array (FPGA).

The processor 130 according to an embodiment of the disclosure may, based on the output layout of the time information being selected, input information related to the output layout of the time information to the artificial intelligence model and obtain the output layout information of the additional information. The detailed description thereof will be described below with reference to FIG. 3.

Figure 3:
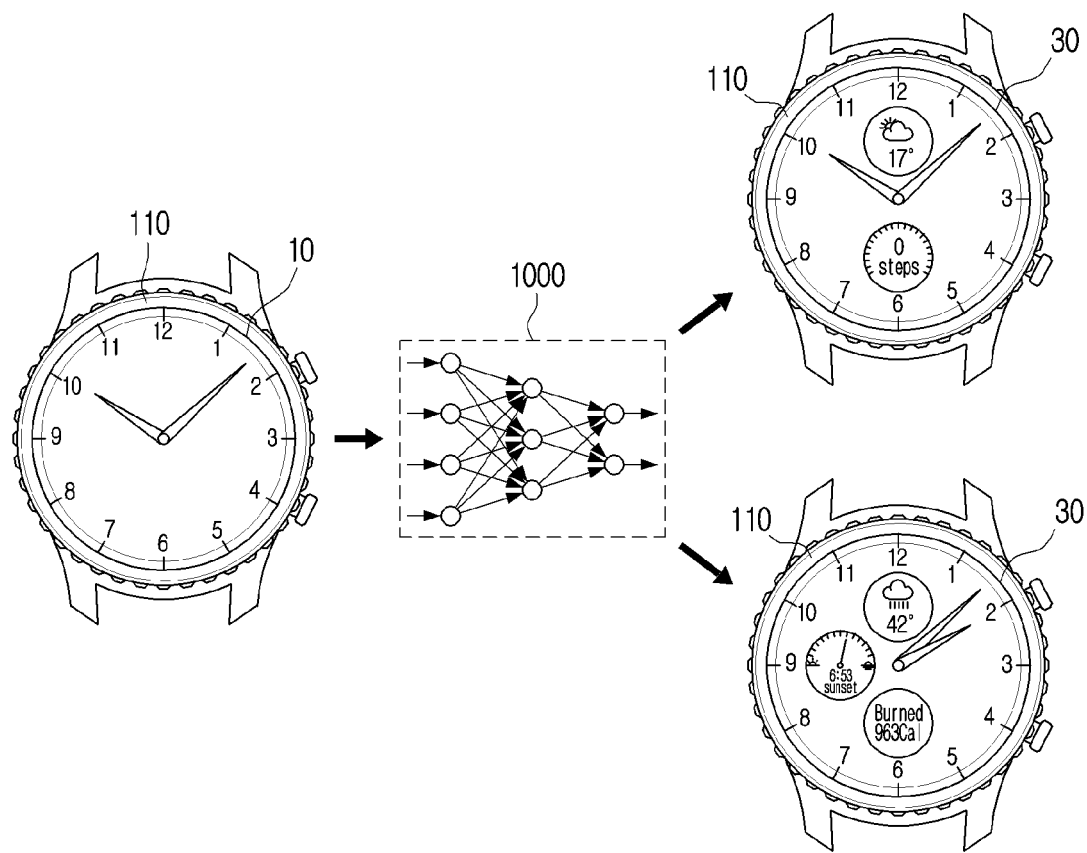
FIG. 3 illustrates a diagram of an example method of obtaining output layout information of additional information according to this disclosure.

FIG. 3 illustrates a diagram of an example method of obtaining output layout information of additional information according to an embodiment.

Referring to FIG. 3, the processor 130 according to an embodiment of the disclosure may provide the output layout of the plurality of the time information which may be selected. For example, each output layout of a plurality of time information may be realized to different background images, the plurality of objects or type. The processor 130 may, based on any one from among the output layouts of the plurality of time information being selected, provide time information as the background image (e.g., watch face), the plurality of objects, and type according to the selected output layout 10. Specifically, the processor 130 may display the background image included in the selected output layout 10 and, provide time information based on information on at least one from among the form, the size, or the color of each of the hour hand, the minute hand, and the second hand included in the selected output layout 10.

In FIG. 3, the text being represented in Arabic numerals in the output layout of the analog form has been described for convenience of description, but this is merely one embodiment and is not limited thereto. For example, the processor 130 may provide time information according to the output layout of the selected time information as the output layout in digital form, and may also display the text in Roman numerals.

Next, the processor 130 may input information related to the output layout 10 of the selected time information to the artificial intelligence model 1000, and obtain output layout information 20 of the additional information.

The additional information may refer to all information providable through the smart watch device 100 other than the unique function (e.g., providing time information, providing current time) of a watch. For example, the processor 130 may additionally display a current weather, sunrise/sunset time, number of walks, or the like corresponding to the set location in addition to the time information. The above-described example is an embodiment of the additional information, and the additional information may include information of various forms.

For example, based on the device being implemented as a display device, the main information may be content provided through the display device, and the additional information may include information related to the corresponding content (e.g., description on content, information related to making of content, etc.), information on other recommended content of a genre identical or similar with the content provided through the display device, or the like.

In another example, based on the device being implemented as an air conditioner, the main information may mean the indoor temperature, the indoor humidity, the desired temperature, and the desired humidity of a space the air conditioner is placed. The additional information may include information on a weekly estimated temperature, a weekly estimated humidity, or the like.

In the past, the additional information which is providable according to the output layout 10 of the selected time information was limited, and there was the problem of the size, the color, and the like of the additional information provided being slightly different from the color, or the like of the background image (e.g., watch face) according to the output layout 10 of the time information. The processor 130 according to the various embodiments of the disclosure may input the output layout 10 of the time information to the artificial intelligence model 1000 and obtain the output layout information 20 of the additional information which is more suitable to the output layout 10 of the time information.

The output layout information 20 of the additional information may include at least one from among a type of additional information, and a number, a size, a color, or a location of a sub user interface (UI) for providing additional information.

Referring to FIG. 3, the processor 130 according to an embodiment of the disclosure may input the output layout 10 of the selected time information to the artificial intelligence model 1000 and obtain the output layout information 20 of the additional information.

For example, the artificial intelligence model 1000 may output the color of the additional information based on the color of the background image included in the output layout 10 of the time information. In another example, the artificial intelligence model 1000 may output the number, the size, the color, or the location of the sub UI for providing additional information based on the location, the form, the size, or the like of each of the hour hand, the minute hand, and the second hand according to the output layout 10 of the time information.

The processor 130 according to an embodiment of the disclosure may provide a UI screen 30 including time information and additional information based on the output layout 10 of the time information and the output layout information 20 of the additional information.

The processor 130 according to an embodiment of the disclosure may obtain a plurality of UI screens 30. In this case, the processor 130 may display any one from among the plurality of UI screens 30 based on the user selection, suitability, or the like. The suitability, or the like may refer to a similarity between the output layout 10 of the time information and the output layout information of the additional information. For example, the processor 130 may control the display 110 to display the UI screen 30 with a relatively high similarity with the color of the background image according to the output layout 10 of the time information and the color of the sub UI for providing the additional information according to the output layout information of the additional information.

The sub UI for proving the additional information may be referred to as a complication, but will be referred as a sub UI below for convenience of description. The information and content provided through the additional information may refer to additional information of all types excluding time information such as, for example, and without limitation, the weather, the activity progress status, the sunrise/sunset time, the moon phase, the notification, the scheduled event, or the like. In addition, the smart watch device 100 may be implemented as an interlocking smart watch performing communication with the user terminal device (e.g., smart phone), and the information and content provided through the additional information may include additional information of various types capable of being provided in the user terminal device. For convenience of description, the information and content provided through the additional information will be collectively designated and described as type of additional information below.

The processor 130 according to an embodiment of the disclosure may input the output layout 10 of the selected time information and the user context to the artificial intelligence model 1000 to obtain the output layout information 20 of the additional information.

The user context may include at least one from among the touch history of the user or the application use history in the external user terminal. The detailed description thereof will be described with reference to FIGS. 4 and 5.

Figure 4:
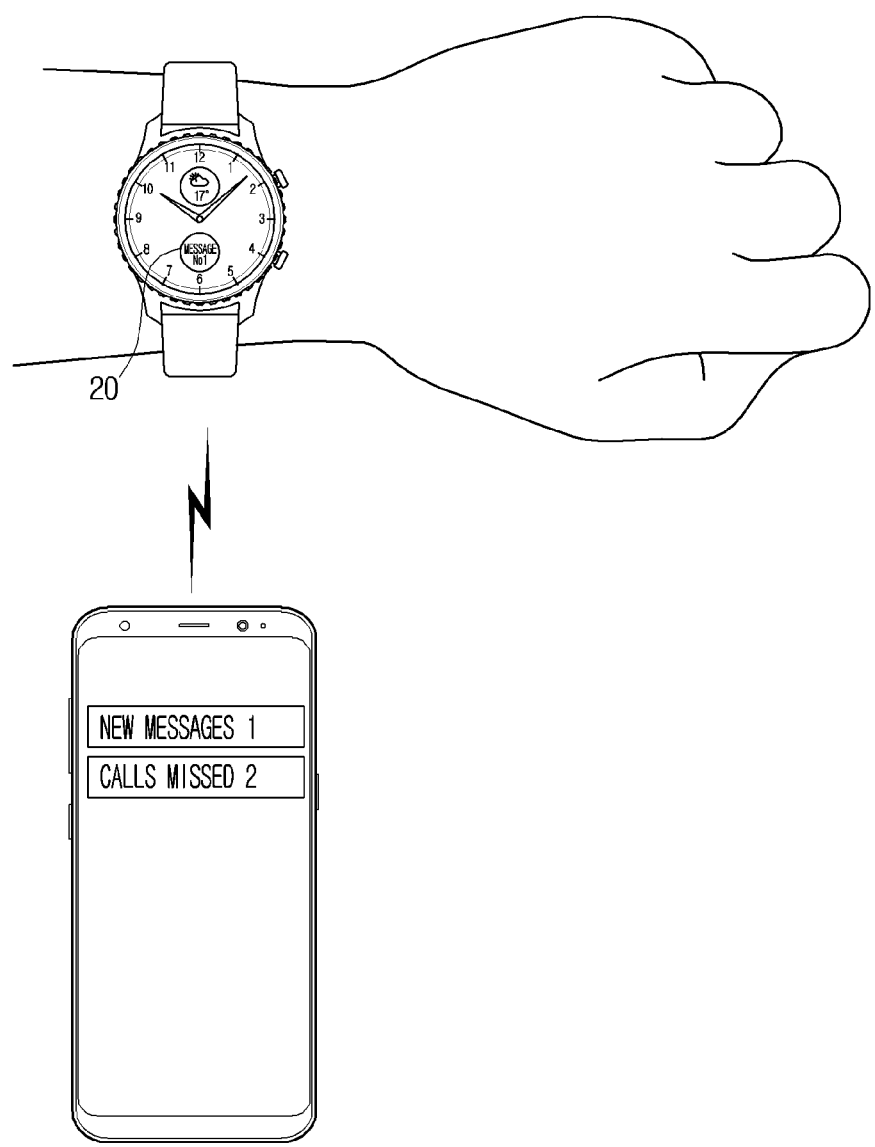
FIG. 4 illustrates a diagram of an example user context according to this disclosure.

FIG. 4 illustrates a diagram of an example user context according to an embodiment.

Referring to FIG. 4, the processor 130 according to an embodiment of the disclosure may input the application use history in the external user terminal 200 to the artificial intelligence model and obtain additional information providing notification related to the function of the application.

For example, the smart watch device 100 according to an embodiment may receive the use history on each of the plurality of applications included in the external user terminal 200 from the external user terminal 200. Next, the processor 130 may identify the additional information of at least one from among the plurality of additional information based on the received use history. In an example, the artificial intelligence model 1000 may output the type of additional information related to the application corresponding to the most likely use history based on the use history. Referring to FIG. 4, based on the application corresponding to the most likely use history in the external user terminal 200 being a messenger application, the processor 130 may obtain the output layout information 20 of the additional information related to the messenger application by using the artificial intelligence model 1000. Next, the processor 130 may obtain the additional information providing notification related to the function of the messenger application based on the output layout information 20 of the obtained additional information. However, this is merely one embodiment, and is not limited thereto.

In one example, the application mainly used in the smart watch device 100 and the external user terminal 200 may be varied per user. For example, a first user may mainly execute an application providing game related content and information in the smart watch device 100 or the external user terminal 200, and a second user may mainly execute an application providing shopping related content and information in the smart watch device 100 or the external user terminal 200.

The processor 130 may input the use history on each of the plurality of applications included in the smart watch device 100 or the use history on each of the plurality of applications included in the external user terminal 200 to the artificial intelligence model 1000 and obtain information and content provided through the additional information, that is the type of additional information. For example, the processor 130 according to the smart watch device 100 of the first user may obtain the output layout information 20 of the additional information providing game related information, content, and notification, and then may display additional information related to games based on the output layout information 20 of the obtained additional information.

In another example, the processor 130 according to the smart watch device 100 of the second user may obtain the output layout information 20 of the additional information providing shopping related information, content and notification, and then display the additional information related to shopping based on the output layout information 20 of the obtained additional information.

Figure 5:
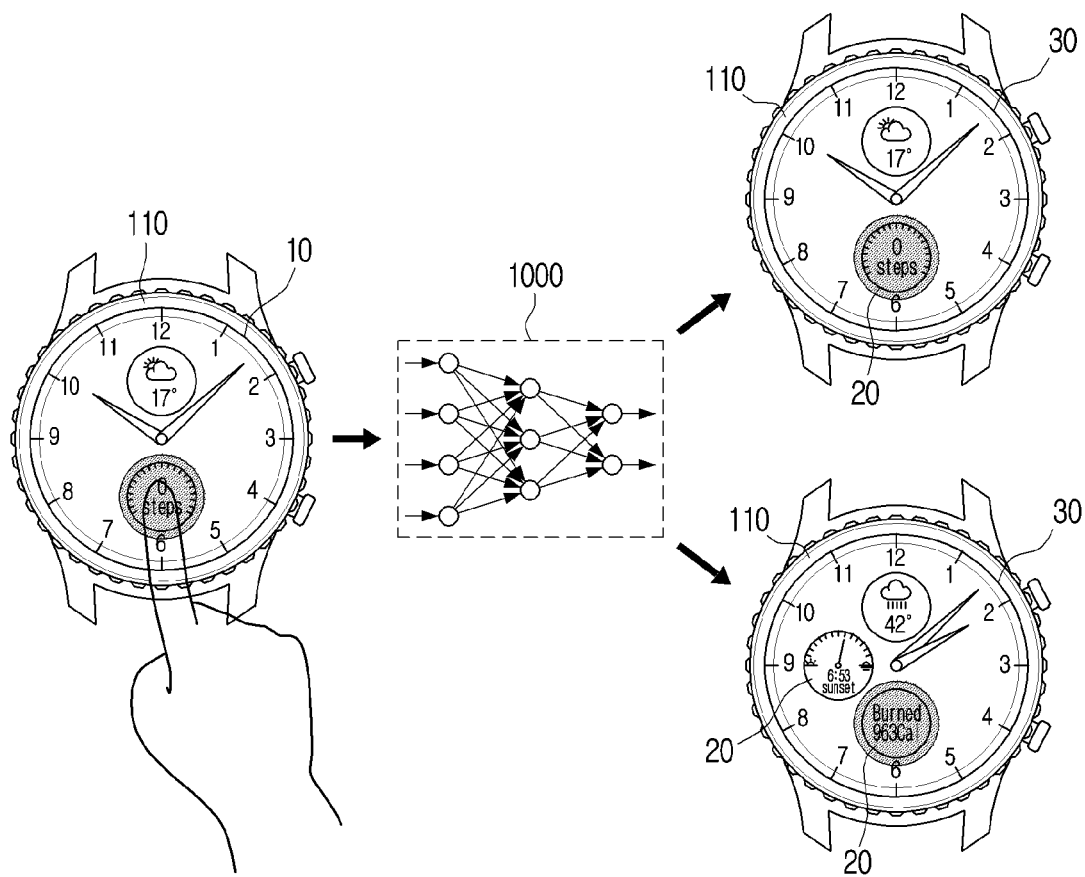
FIG. 5 illustrates a diagram of an example touch history of a user according to this disclosure.

FIG. 5 illustrates a diagram of an example touch history of a user according to an embodiment.

Referring to FIG. 5, the processor 130 according to an embodiment of the disclosure may input the touch history of the user to the artificial intelligence model 1000 and obtain information on at least one from among the size or location of the sub UI for providing additional information.

For example, the size of the touch area for each user of the smart watch device 100 may be varied. The processor 130 according to an embodiment may input the touch history to the artificial intelligence model 1000 so that the size of the sub UI for providing the additional information fits the touch area of the user of the smart watch device 100 and obtain information on at least one from among the size or location of the sub UI for providing the additional information.

The touch history of the user may include at least one from among the touch area or the touch location.

According to an embodiment, the touch area may also be different since the finger thickness of each user of the smart watch device 100 is different. The processor 130 may provide a large sub UI size proportional to the touch area to a user with a relatively wide touch area based on the touch history, and provide a small sub UI size proportional to the touch area to a user with a relatively narrow touch area. Accordingly, the processor 130 may prevent a triggering of an unintended touch.

In addition, the processor 130 may input the touch location to the artificial intelligence model 1000 to obtain the location of the sub UI for providing the additional information. For example, the main touch location conveniently felt by each user may be different. The processor 130 may display the sub UI to a touch location conveniently felt by the user based on the main touch location of the user included in the touch history.

Figure 6:
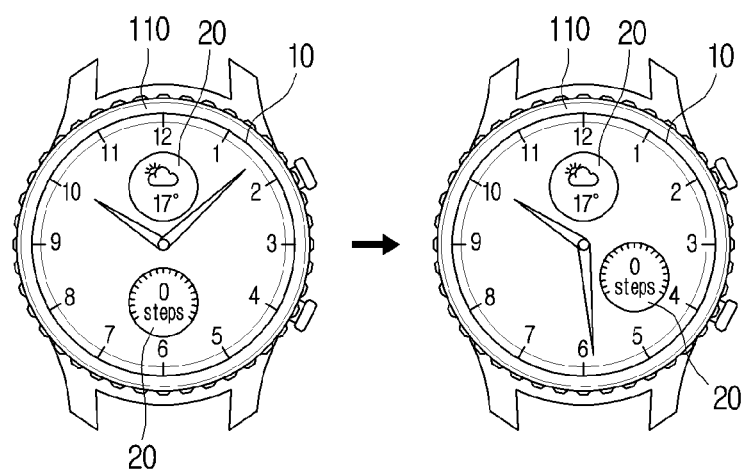
FIG. 6 illustrates a diagram of an example method for changing a location of a sub UI according to this disclosure.

FIG. 6 illustrates a diagram of an example method for changing a location of a sub UI according to an embodiment.

Referring to FIG. 6, the processor 130 according to an embodiment may fix or flexibly change the location of the sub UI.

In an example, the processor 130 may change the location of the sub UI for providing additional information based on the location of at least one from among the hour hand, the minute hand, and the second hand according to the time information.

For example, the processor 130 may change the location of the sub UI so that a one area of the sub UI is not obscured according to the location of the hour hand and the minute hand according to the current time information.

Referring to FIG. 6, in the smart watch device 100 illustrated on the left side, the sub UI located at the upper end and the lower end may not be obscured by the hour hand and the minute hand, but one area of the sub UI may not be displayed when the hour hand or the minute hand moves according to the passing of time. In this case, the processor 130 may, like the smart watch device 100 illustrated on the right side, move the location of the sub UI so that all area of the sub UI is not obscured by the hour hand or the minute hand.

As illustrated in FIG. 6, the processor 130 may continuously move the location of the sub UI according to the movement of the hour hand and the minute hand, or move the location of the sub UI at a pre-set time interval (e.g., 5 minute interval) so that one area of the sub UI is not obscured by the hour hand and the minute hand.

In addition, the processor 130 according to an embodiment may fix or flexibly change the location of the sub UI for providing additional information based on the type of the additional information. For example, the content and information provided through the additional information may include an animation effect which continuously changes or based on the update interval being less than a threshold time (e.g., 1 minute or less), the processor 130 may move the location of the sub UI so that location of the sub UI for providing the corresponding additional information is not obscured by the hour hand and the minute hand. In another example, based on the update interval of the content and information provided through the additional information being less than a threshold time (e.g., one day interval), the processor 130 may fix the location of the sub UI for providing the corresponding additional information. However, this is merely one embodiment, and may not be limited thereto.

Figure 7:
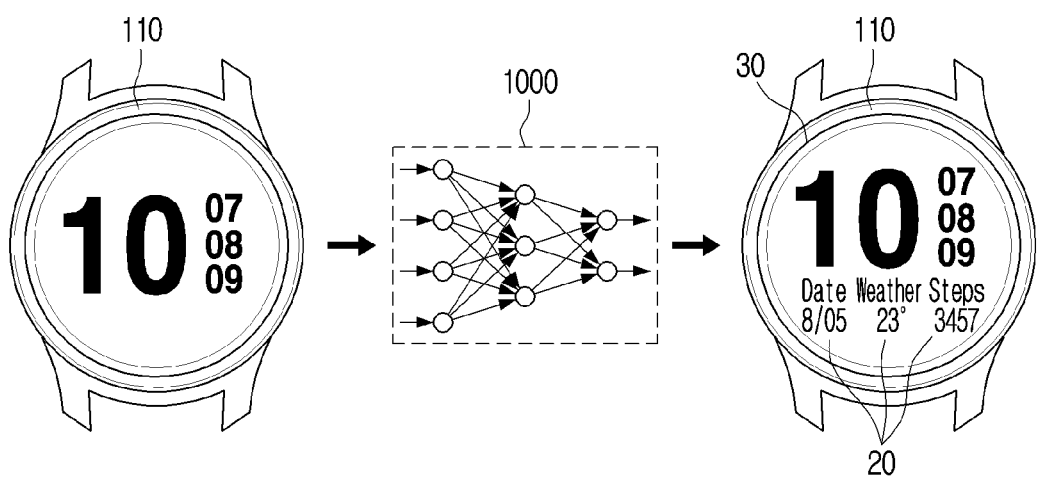
FIG. 7 illustrates a diagram of an example output layout of time information according to this disclosure.

FIG. 7 illustrates a diagram of an example output layout of the time information according to an embodiment.

Referring to FIG. 7, the output layout 10 of the time information provided in the smart watch device 100 according to an embodiment of the disclosure may include the output layout of an analog form or the output layout of a digital form.

The processor 130 according to an embodiment may, based on the output layout 10 of the time information being in analog form, input information related to the output layout in analog form to the artificial intelligence model 1000 and obtain the output layout information 20 in analog form corresponding to the additional information.

In another example, referring to FIG. 7, based on the output layout 10 of the time information being in digital form, the processor may input information related to the output layout in digital form to the artificial intelligence model 1000 and obtain the output layout information 20 in digital form corresponding to the additional information.

FIG. 7, unlike the above-described FIGS. 3 to 6, illustrates the output layout 10 of the time information being in digital form. The processor 130 may provide time formation (e.g., current time) in digital form. Next, the processor 130 may input information related to the output layout in digital form to the artificial intelligence model 1000. The artificial intelligence model 1000 according to an embodiment may output the output layout of the additional information in digital form for the similarity of the output layout 10 of the time information and the output layout information 20 of additional information to be a threshold value or more.

Next, the processor 130 may provide the sub UI for providing additional information in digital form based on the output layout information in digital form corresponding to the additional information. The digital form may refer to representing the content and information for providing through the additional information in text such as characters, numbers, and the like.

In addition, the form may refer to the representing by quantifying the content and information for providing through the additional information as an angle and length of an object in a continuously changing needle form.

According an embodiment, in FIG. 7, when the output layout of the time information is in analog form, the sub UI may not necessarily be limited to the analog form. In addition, when the output layout of the time information is in digital form, the sub UI may not necessarily be limited to the digital form. For example, the processor 130 may provide the time information in the analog form, and provide the sub UI for providing the additional information in the digital form.

Figure 8:
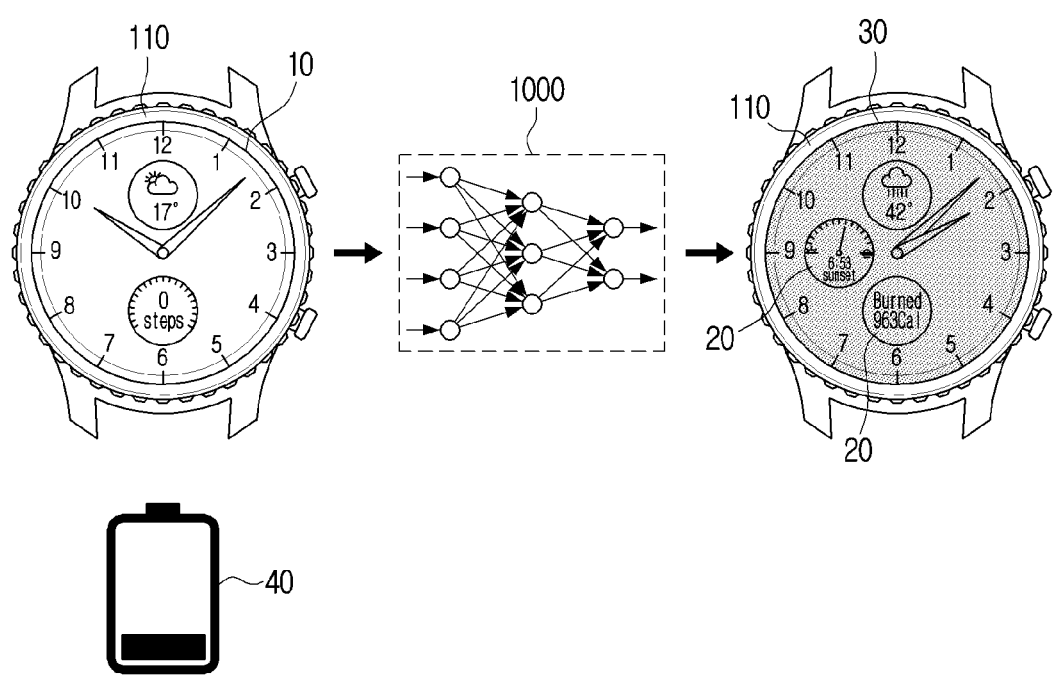
FIG. 8 illustrates a diagram of example remaining battery information according to this disclosure.

FIG. 8 illustrates a diagram of example remaining battery information according to an embodiment.

Referring to FIG. 8, the processor 130 according to an embodiment of the disclosure may input the output layout 10 of the time information and remaining battery information 40 of the smart watch device 100 to the artificial intelligence model 1000 and obtain the output layout information 20 of the additional information.

In an example, the artificial intelligence model 1000 may be a model trained to output the sub UI of any one corresponding to the remaining battery information 40 from among the plurality of sub UIs for providing the same additional information. For example, the sub UI according to the output layout information 20 of the additional information output by the artificial intelligence model 1000 may be varied according to the remaining battery information 40 of the smart watch device 100.

In an example, based on pixels in an on-state increasing according to the display of the sub UI from among the plurality of pixels included in the display 110, battery consumption may increase proportionally. The artificial intelligence model 1000 according to an embodiment may, based on the remaining battery amount being a threshold remaining amount or more based on the remaining battery information 40, output the output layout information 20 of the additional information to display the sub UI in which an on pixel ratio (OPR) is highly maintained. For example, the processor 130 may display the sub UI in a color combination which increases the turned-on state of the pixels to increase an aesthetic effect of the sub UI.

In another example, the artificial intelligence model 1000 may, based on the remaining battery amount being less than the threshold battery amount based on the remaining battery information 40, output the output layout information 20 of the additional information to display the sub UI in which the on pixel ratio (OPR) is lowly maintained. For example, the processor 130 may display the sub UI which provides the content and information in a red color on a black color background.

Accordingly, the artificial intelligence model 1000 may be a model trained to output the output layout information corresponding to the input remaining battery information 40 from among the plurality of output layouts having different battery consumption amounts.

In addition, the processor 130 according to an embodiment of the disclosure may, based on the smart watch device 100 entering into a standby mode, input information related to the output layout 10 of the time information and information on the estimated battery consumption amount in the standby mode to the artificial intelligence model 1000 and obtain the output layout information 20 of the additional information.

The standby mode may be an always on display (AOD) mode. The AOD mode may be a mode displaying time information and additional information such date, time, remaining battery amount, notification, or the like, even after providing by the screen has been completed.

The AOD mode according to an embodiment may, while continuously displaying the time information and the additional information, require reducing the battery consumption amount to less than a threshold consumption amount to prevent a problem of the remaining battery amount decreasing significantly.

Because the battery consumption amount may be proportional to the number of pixels in the on-state in the case of a display 110 implemented as an OLED, the artificial intelligence model 1000 according to an embodiment may output the output layout information 20 of the additional information so that the on pixel ratio (OPR) does not exceed a threshold ratio.

For example, in the AOD mode, based on the number of pixels in the on-state increasing according to the display of the sub UI and the OPR exceeding the threshold ratio, there may be a problem of battery consumption amount increasing. The processor 130 may input the estimated battery consumption amount according to the display of the time information and the additional information in the AOD mode to the artificial intelligence model and obtain the output layout information 20 of the additional information in which the OPR maintains the threshold ratio in the AOD mode.

The processor 130 according to an embodiment may display the sub UI for providing additional information based on the obtained output layout information 20. For example, the processor 130 may provide additional information to a first sub UI in a normal mode (e.g., a mode other than AOD mode), and provide additional information to a second sub UI in the standby mode (e.g., AOD mode). Here, the first sub UI and second sub UI may be a sub UI for providing the same additional information, and the first sub UI may be a sub UI with a relatively larger number of pixels in the on-state than the second UI.

In another example, the processor 130 may display the time information in the AOD mode, and may not display additional information.

In another example, the processor 130 may display only a portion of additional information based on the type of additional information in the AOD mode, and may not display the remaining additional information. For example, the processor 130 may include an animation effect in which the content and information provided through the additional information is continuously changed, or based on the update interval being less than the threshold time (e.g., within 1 minute), the processor 130 may display the sub UI for providing the corresponding additional information in the AOD mode. In another example, based on the update interval of the content and information provided through the additional information being a threshold time or more (e.g., one day interval), the processor 130 may not display the sub UI for providing the corresponding additional information in the AOD mode. However, this is merely one embodiment, and is not limited thereto.

Figure 9:
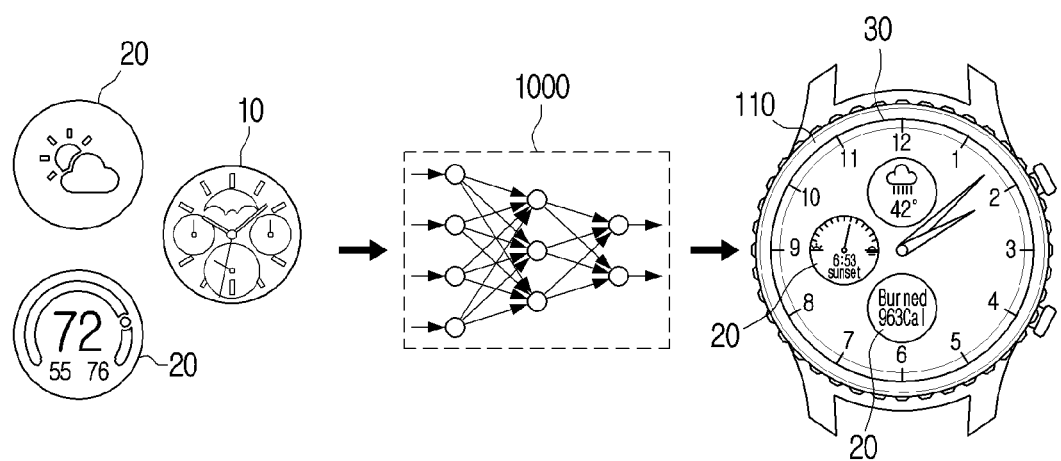
FIG. 9 illustrates a diagram of an example UI screen according to this disclosure.

FIG. 9 illustrates a diagram of an example UI screen according to an embodiment.

Referring to FIG. 9, the processor 130 according to an embodiment of the disclosure may obtain the UI screen 30 for providing time information and additional information based on the output layout 10 of the time information and the output layout information 20 of additional information.

In addition, the processor 130 according to an embodiment may input the output layout 10 of the time information and the output layout information 20 of additional information to the artificial intelligence model 1000 to obtain the UI screen 30.

According to the related art, the number, the size, and the color of additional information (e.g., complication) providable according to the output layout 10 (e.g., watch face) of the time information was fixed, and the developer (e.g., 3rd party developer) of the application related to the additional information faced the difficulty of having to develop and generate the output layout information 20 of additional information for each output layout 10 of the various time information.

Accordingly, the selection of sub UIs for providing additional information of the user was either very limiting, or there was the problem of not being able to display the sub UI in the smart watch display 110 without development and generation by the 3rd party developer.

According to the various embodiments of the disclosure, even without the development and generation of the developer on the output layout information 20 of the additional information, the processor 130 may use the artificial intelligence model and obtain the output layout information 20 of the additional information corresponding to the output layouts 10 of the various time information. Next, the processor 130 may display the sub UI for providing the additional information to the smart watch device 100 based on the obtained output layout information 20.

Figure 10:
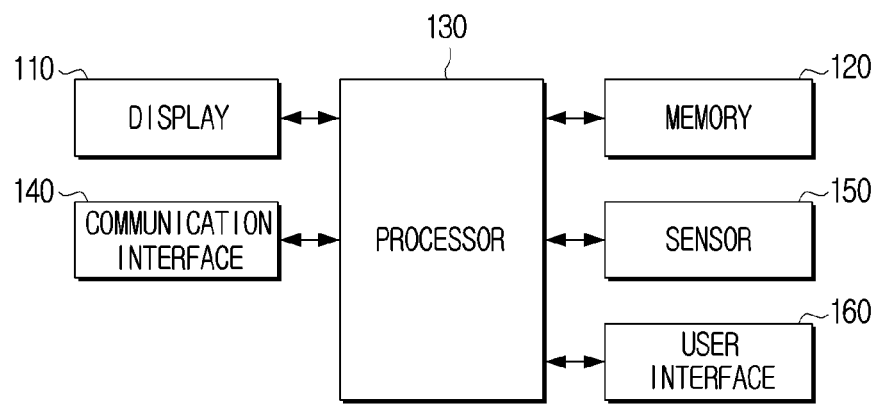
FIG. 10 illustrates a detailed block diagram of an example device according to this disclosure.

FIG. 10 illustrates a detailed block diagram of an example smart watch device according to an embodiment.

Referring to FIG. 10, the smart watch device 100 according to an embodiment of the disclosure may include a display 110, a memory 120, a processor 130, a communication interface 140, a sensor 150, and a user interface 160.

The memory 120 may store data necessary for the various embodiments of the disclosure. The memory 120 may be implemented as a memory form embedded in the smart watch device 100 according to a data storage use, or as a memory form attachable/detachable to the smart watch device 100. For example, the data for the driving of the smart watch device 100 may be stored in a memory embedded to the smart watch device 100, and data for an expansion function of the smart watch device 100 may be stored in a memory attachable/detachable to the smart watch device 100. The memory embedded in the smart watch device 100 may be implemented as at least one from among a volatile memory (e.g., a dynamic random access memory (DRAM), a static RAM (SRAM), or a synchronous dynamic RAM (SDRAM)), or a non-volatile memory (e.g., one time programmable read only memory (OTPROM), a programmable ROM (PROM), an erasable and programmable ROM (EPROM), an electrically erasable and programmable ROM (EEPROM), mask ROM, flash ROM, a flash memory (e.g., NAND flash or NOR flash), a hard disk drive (HDD) or a solid state drive (SSD)). In addition, in the case of a memory attachable/detachable to the smart watch device 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The memory 120 according to an embodiment may store at least one instruction for controlling the smart watch device 100 or a computer program including the instructions.

In the various embodiments described above, the artificial intelligence model 1000 was described as being stored in the memory 120, but the artificial intelligence model 1000 may be stored on an external device such as a server (not shown), and the smart watch device 100 may perform communication with the external server to receive the output layout 10 of the time information and the output layout information 20 of additional information. Next, the processor 130 may display the time information and the additional information based on the output layout 10 of the time information and the output layout information 20 of the additional information received from the external server.

The function related to the artificial intelligence according to the disclosure may be operated through the processor 130 and the memory 120. The processor 130 may be comprised of one or a plurality of processors. The one or plurality of processor may be a generic use processor such as a CPU, an AP, or a digital signal processor (DSP), a graphics dedicated processor such as a GPU or a vision processing unit (VPU), or an artificial intelligence dedicated processor such as an NPU. The one or plurality of processors may control for the input data to be processed according to a pre-defined operation rule or an artificial intelligence model stored in the memory 120. Alternatively, if the one or plurality of processors is an artificial intelligence dedicated processor, the artificial intelligence dedicated processor may be designed to a hardware structure specializing in the processing of a specific artificial intelligence model.

The pre-defined operation rule or the artificial intelligence model is characterized by being created through learning. The being created through learning referred herein refers to the pre-defined operation rule or artificial intelligence model being created to perform a desired feature (or, purpose) since the basic artificial intelligence module is trained by a learning algorithm using a plurality of learning data. The learning may be carried out in the machine itself in which the artificial intelligence according to the disclosure is performed, or carried out through a separate server and/or system. Examples of the learning algorithm may include a supervised learning, an unsupervised learning, a semi-supervised learning, or a reinforcement learning, but is not limited to the above-described examples.

The artificial intelligence model may be comprised of a plurality of neural network layers. The each of the plurality of neural network layers may include a plurality of weight values, and may perform neural network processing through processing between the processing results of a previous layer and the plurality of weight values. The plurality of weight values comprised by the plurality of neural network layers may be optimized by the learning result of the artificial intelligence model. For example, the plurality of weight values may be updated for a loss value or a cost value obtained by the artificial intelligence model during the learning process to reduced or optimized. The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but the embodiment is not limited to the above-described examples.

The communication interface 140 may receive input of various data. In addition, the smart watch device 100 may control the communication interface 140 to perform communication with the external user terminal. For example, the communication interface 140 may receive the use history, the output layout 10 of the time information, and output layout information 20 of additional information from an external device (e.g., source device, external user terminal), an external storage medium (e.g., USB memory), an external server (e.g., WEBHARD), or the like through a communication method such as, for example, and without limitation, an AP based Wi-Fi (e.g., Wi-Fi, wireless LAN network), Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like.

The sensor 150 may, for example, measure a physical quantity or detect an operating state of the smart watch device 100 and convert the measured or detected information to an electric signal. The sensor 150 may, for example, include at least one from among a gesture sensor, a gyroscope sensor, an atmospheric pressure sensor, a magnetic sensor, an accelerometer sensor, a grip sensor, a proximity sensor, a color sensor (e.g., red, green, and blue (RGB) sensor), a biometric sensor, a temperature/humidity sensor, an illuminance sensor, or an ultra violet (UV) sensor. Additionally or alternatively, the sensor 150 may, for example, include an e-nose sensor, an electromyography (EMG) sensor, an electroencephalogram (EEG) sensor, an electrocardiogram (ECG) sensor, an infrared (IR) sensor, an iris sensor and/or a finger print sensor. The sensor 150 may further include a control circuitry for controlling one or more sensors comprised therein. In an embodiment, the smart watch device 100 may, as a part of or separate from the processor 130, further include a processor configured to control the sensor 150, and may control the sensor 150 while the processor 130 is in a sleep state.

Specifically, the sensor 150 according to an embodiment may be implemented as a sensor capable of measuring biometric information. For example, the sensor 150 may be implemented as a sensor capable of measuring at least one from among a heart rate, a blood glucose, a blood pressure, or a temperature of the user. The processor 130 according to an embodiment may provide the UI screen 30 including the sub UI for providing additional information related to the user biometric information based on the user biometric information detected through the sensor 150. For example, the sensor 150 may include a heart rate sensor. The heart rate sensor may, as a sensor capable of sensing the heart rate within the skin of parts of the body when the smart watch device 100 contacts the parts of the body of the user, include at least or a combination of two from among an optical heart rate sensor which senses heart rate optically by using an optical signal of a visible ray wavelength area or an ECG heart rate sensor which senses the heart rate through the electrocardiogram method. The processor 130 may display the additional information (e.g., complication) for providing information related to the heart rate of the user based on the detected data received from the heart rate sensor.

In addition, the sensor 150 may be implemented as a detection sensor detecting a movement of the smart watch device 100. For example, the sensor 150 may include at least one from among an accelerometer sensor (not shown), a geomagnetic sensor (not shown), a gravity sensor (not shown), and a gyroscope sensor (not shown). Then the sensor 150 may transmit information on the detected movement of the smart watch device 100 to the processor 130. The processor 130 may display the additional information for providing the biometric information of the user, the status information of the smart watch device 100, or the like based on the received information.

The accelerometer sensor may, as a sensor measuring the acceleration or a strength of impact of the moving smart watch device 100, be an essential sensor used not only in electronic devices such as the smart phone and the tablet PC, but also in control systems of various transportation means such as an automobile, a train, a plane, or the like, robots, and the like.

The geomagnetic sensor may, as an electronic compass capable of detecting an azimuth by using a magnetic field of Earth, be a sensor used in tracking location, 3D image games, or the like, or used in smart phones, two-way radios, GPSs, PDAs, navigation devices, or the like.

The gravity sensor may, as a sensor detecting to which direction gravity is applied, be a sensor used in a role such as detecting direction by automatically rotating direction according to the direction the user is holding the smart watch device 100.

The gyroscope sensor 114 may be a sensor which assists in the recognition of a more detailed and accurate operation by rotating an accelerometer sensor according to the related art and recognizing a 6-axes direction.

The sensor 150 according to an embodiment of the disclosure may detect the movement of the smart watch device 100, and transmit the detected data to the processor 130. The processor 130 may display the complication for providing information corresponding to the user movement based on the received detected data. For example, the processor 130 may display the complication for providing a number of walks, a moving distance, a calorie consumption, or the like as information corresponding to the user movement.

In another example, the processor 130 may identify the sports performed by the user based on the detected data. For example, the processor 130 may, based on identifying that the user is marathoning based on the detected data, display the complication for providing at least one from among the number of walks, the moving distance, the calorie consumption, the change in height, the heart rate of the user, or the temperature of the user. In another example, the processor 130 may, based on identifying that the user is cycling based on the detected data, display the complication for providing at least one from among the moving distance, the moving path on the map, the calorie consumption, the change in height, the heart rate of the user, or the temperature of the user.

The user interface 160 may be implemented as a device such as a crown shaped button, a button, a touch pad, a mouse, or a keyboard, or may be implemented as a touch screen, a remote control transceiver, or the like capable of performing both the above-described display function and the operation input function. The remote control transceiver may receive a remote control signal from an external remote control device through at least one communication method from among an infrared communication, a Bluetooth communication, or a Wi-Fi communication, or may transmit the remote control signal.

The electronic device 100 may include an outputter outputting a sound signal according to an embodiment. For example, the outputter may convert a digital signal processed in the processor 130 to an analog signal, and amplify and output the signal. For example, the outputter may include at least one speaker unit, a D/A converter, an audio amplifier, or the like capable of outputting at least one channel. The outputter according to an embodiment may be implemented to output various multi-channel sound signals. In this case, the processor 130 may be configured to control the outputter to output by enhance processing the input sound signal to correspond to the enhance processing of the input image. For example, the processor 130 may convert the input 2-channel sound signal to a virtual multi-channel (e.g., 5.1 channels) sound signal, recognize the location the receiver device 100' is placed and process as a 3-dimensional sound signal optimized to the space, or provide an optimized sound signal according to the type of input image (e.g., genre of content).

Figure 11:
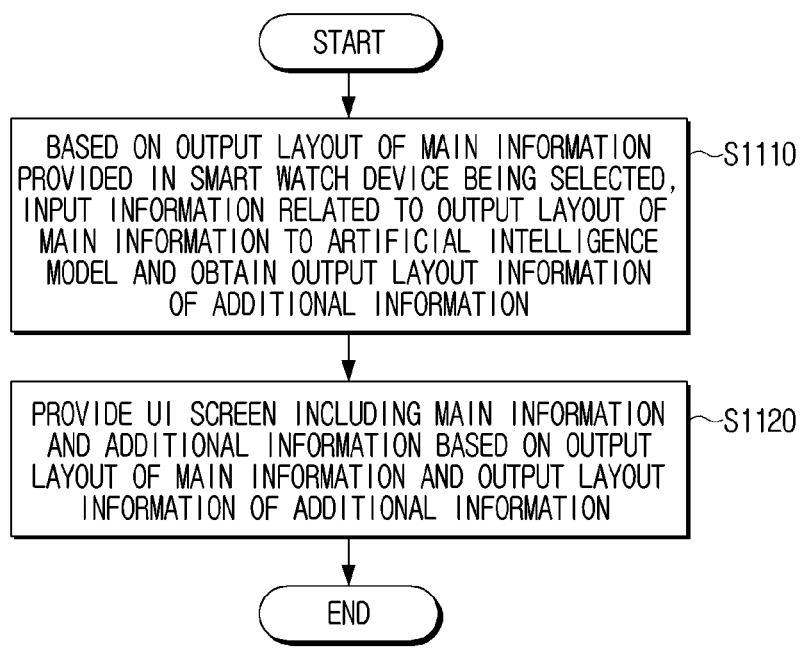
FIG. 11 illustrates a flowchart of an example control method of a device according to this disclosure.

FIG. 11 illustrates a flowchart of an example control method of a smart watch device according to an embodiment.

According to a control method of the smart watch device including an artificial intelligence model trained to obtain the output layout information of the additional information provided in the smart watch device illustrated in FIG. 11, first, based on the output layout of the time information provided in the smart watch device being selected, input the information related to the output layout of the time information to the artificial intelligence model and obtain the output layout information of the additional information (S1110).

Next, provide the UI screen including the time information and the additional information based on the output layout of the time information and the output layout information of additional information (S1120).

The output layout of the time information may include information on at least one from among the form, the size, or the color of each of the hour hand, the minute hand, and the second hand for providing time information, and the output layout information of additional information may include at least one from among the number, the size, the color, or the location of the sub UI for providing the type of additional information and the additional information.

Step S1110 for obtaining the output layout information of the additional information according to an embodiment may include, based on the output layout of the time information provided in the smart watch device being selected, obtaining the output layout information of the additional information by inputting the information related to the output layout and the user context to the artificial intelligence model. The user context may include at least one from among the touch history of the user or the application use history in the external user terminal.

The touch history of the user according to an embodiment may include at least one from among the touch area or the touch location, and the step S1110 for obtaining the output layout information of the additional information may include obtaining at least one from among the size or the location of the sub UI for providing additional information by inputting at least one from among the touch area or the touch location to the artificial intelligence model.

The control method according to an embodiment may further include obtaining additional information which provides notification related to the function of the application by inputting the application use history in the external user terminal to the artificial intelligence model.

In addition, the control method according to an embodiment may further include changing the location of the sub UI for providing the additional information based on the location of at least one from among the hour hand, the minute hand, and the second hand based on the current time information.

In addition, the output layout of the time information provided in the smart watch device may include the output layout in analog form or the output layout in digital form.

Step 1110, which obtains the output layout information of the additional information according to an embodiment, may include obtaining, based on the output layout of the time information being in analog form, the output layout information in analog form corresponding to additional information by inputting the information related to the output layout in analog form to the artificial intelligence model, and obtaining, based on the output layout of the time information being in digital form, the output layout information in digital form corresponding to additional information by inputting the information related to the output layout in digital form to the artificial intelligence model.

In addition, the smart watch device may include a sensor, and the control method may further include controlling the display to provide the UI screen including additional information related to the detected user biometric information based on the user biometric information detected through the sensor.

Step S1110 which obtains the output layout information of the additional information according to an embodiment may include obtaining the output layout information of the additional information by inputting the information related to the output layout of the time information and the remaining battery information of the smart watch device to the artificial intelligence model. The artificial intelligence model may be a model trained to output the output layout information corresponding to the input remaining battery information from among the plurality of output layouts having different battery consumptions.

Step S1110 which obtains the output layout information of the additional information according to an embodiment may include obtaining, based on the smart watch device entering the standby mode, the output layout information of the additional information by inputting the information related to the output layout of the time information and the information on the estimated battery consumption in the standby mode to the artificial intelligence model, and the artificial intelligence model may be trained to output the output layout information corresponding to the input estimated battery consumption from among the plurality of output layouts having different battery consumptions.

However, the various embodiments of the disclosure may be applied to not only the smart watch device, but also all electronic device capable of image processing such as a display device.

The various embodiments described above may be implemented in a recordable medium which is readable by a computer or a device similar to the computer using software, hardware, or the combination of software and hardware. In some cases, embodiments described herein may be implemented by the processor 130 itself. According to a software implementation, embodiments such as the procedures and functions described herein may be implemented with separate software modules. Each of the software modules may perform one or more of the functions and operations described herein.

The computer instructions for performing the processing operations in the sound output of the device 100 according to the various embodiments described above may be stored in a non-transitory computer-readable medium. The computer instructions stored in this non-transitory computer-readable medium may cause a specific device to perform the processing operations in the sound output device according to the above-described various embodiments when executed by the processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While the present disclosure has been illustrated and described with reference to various example embodiments thereof, the present disclosure is not limited to the specific embodiments described. It will be understood by those skilled in the art that various changes in form and details may be made therein without departing from the spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A device, comprising:
a display;

a memory configured to store an artificial intelligence model trained to obtain an output layout information of an additional information provided in the device; and a processor connected to the display and the memory and configured to control the device, wherein the processor is configured to:
input information related to an output layout of main information to the artificial intelligence model based on the output layout of the main information provided in the device being selected, the output layout of the main information comprising a size of the main information for displaying the main information, identify, using the artificial intelligence model, an output layout of the additional information based on the output layout of the main information, the output layout of the additional information comprising a size of the additional information for displaying the additional information, obtain the output layout information of the additional information from the artificial intelligence model after the output layout of the additional information is identified by the artificial intelligence model based on the output layout of the main information, and control the display to display a user interface (UI) screen comprising the main information and the additional information based on the output layout of the main information and the output layout information of the additional information.

2. The device of claim 1, wherein the main information is a time information,
wherein the output layout of the time information comprises information on at least one from among a form, a size, or a color of each of an hour hand, a minute hand, and a second hand for displaying the time information, and
wherein the output layout information of the additional information further comprises at least one from among a number, a color, or a location of a sub UI for displaying a type of the additional information and the additional information.

3. The device of claim 1, wherein the processor is further configured to:
obtain, based on the output layout of the main information provided in the device being selected, the output layout information of the additional information by inputting information related to the output layout and a user context to the artificial intelligence model, wherein the user context comprises at least one from among a touch history of a user or a use history of an application in an external user terminal.

4. The device of claim 3, wherein the touch history of the user comprises at least one from among a touch area or a touch location, and
wherein the processor is further configured to:
obtain at least one from among a size or location of a sub UI for displaying the additional information by inputting at least one from among the touch area or the touch location to the artificial intelligence model.

5. The device of claim 3, wherein the processor is further configured to:
obtain the additional information providing a notification related to a function of the application by inputting an application use history in the external user terminal to the artificial intelligence model.

6. The device of claim 1, wherein the main information is a time information, and wherein the processor is further configured to:
change a location of a sub UI for displaying the additional information based on location information of at least one from among an hour hand, a minute hand, and a second hand based on a current time information.

7. The device of claim 1, wherein the main information is a time information,
wherein the output layout of the time information provided in the device comprises the output layout in analog form or the output layout in digital form, and
wherein the processor is further configured to:
obtain, based on the output layout of the time information being in analog form, the output layout information in analog form corresponding to the additional information by inputting information related to the output layout in the analog form to the artificial intelligence model, and
obtain, based on the output layout of the time information being in digital form, the output layout information in digital form corresponding to the additional information by inputting information related to the output layout in the digital form to the artificial intelligence model.

8. The device of claim 1, further comprising:
a sensor, and
wherein the processor is further configured to:
based on a user biometric information detected through the sensor, control the display to display the UI screen comprising additional information related to the detected user biometric information.

9. The device of claim 1, wherein the processor is further configured to:
obtain the output layout information of the additional information by inputting information related to the output layout of the main information and a remaining battery information of the device to the artificial intelligence model, and wherein the artificial intelligence model is trained to output the output layout information corresponding to the remaining battery information from among a plurality of output layouts having different battery consumptions.

10. The device of claim 1, wherein the processor is further configured to:
obtain, based on the device entering a standby mode, the output layout information of the additional information by inputting information related to the output layout of the main information and information on an estimated battery consumption in the standby mode to the artificial intelligence model, and
wherein the artificial intelligence model is trained to output the output layout information corresponding to the estimated battery consumption from among a plurality of output layouts having different battery consumptions.

11. A control method of a device comprising an artificial intelligence model trained to obtain an output layout information of an additional information provided in the device, the method comprising:
inputting information related to an output layout of main information to the artificial intelligence model based on the output layout of the main information provided in the device being selected, the output layout of the main information comprising a size of the main information for displaying the main information;
identifying, using the artificial intelligence model, an output layout of the additional information based on the output layout of the main information, the output layout of the additional information comprising a size of the additional information for displaying the additional information;

obtaining the output layout information of the additional information from the artificial intelligence model after the output layout of the additional information is identified by the artificial intelligence model based on the output layout of the main information; and displaying, by a display, a user interface (UI) screen comprising the main information and the additional information based on the output layout of the main information and the output layout information of the additional information.

12. The method of claim 11, wherein the main information is a time information, and wherein the output layout of the time information comprises information on at least one from among a form, a size, or a color of each of an hour hand, a minute hand, and a second hand for displaying the time information, and wherein the output layout information of the additional information further comprises at least one from among a number, a color, or a location of a sub UI for displaying a type of the additional information and the additional information.

13. The method of claim 11, wherein the obtaining the output layout information of the additional information further comprises:

obtaining, based on the output layout of the main information provided in the device being selected, the output layout information of the additional information by inputting information related to the output layout and a user context to the artificial intelligence model, wherein the user context comprises at least one from among a touch history of a user or a use history of an application in an external user terminal.

14. The method of claim 13, wherein the touch history of the user comprises at least one from among a touch area or a touch location, and wherein the obtaining the output layout information of the additional information further comprises:

obtaining at least one from among a size or a location of a sub UI for displaying the additional information by inputting at least one from among the touch area or the touch location to the artificial intelligence model.

15. The method of claim 13, further comprising:

obtaining the additional information providing a notification related to a function of the application by inputting an application use history in the external user terminal to the artificial intelligence model.

16. The method of claim 11, wherein the main information is a time information, and wherein the method further comprises:

changing a location of a sub UI for displaying the additional information based on location information of at least one from among an hour hand, a minute hand, and a second hand based on a current time information.

17. The method of claim 11, wherein the main information is a time information, wherein the output layout of the time information provided in the device comprises the output layout in analog form or the output layout in digital form, wherein the obtaining the output layout information of the additional information comprises:

obtaining, based on the output layout of the time information being in analog form, the output layout information in analog form corresponding to the additional information by inputting information related to the output layout in the analog form to the artificial intelligence model; and obtaining, based on the output layout of the time information being in the digital form, the output layout information of the digital form corresponding to the additional information by inputting information related to the output layout of the digital form to the artificial intelligence model.

18. The method of claim 11, wherein the device further comprises a sensor, and wherein the method further comprises:

controlling, based on a user biometric information detected through the sensor, the display to display the UI screen comprising additional information related to the detected user biometric information.

19. The method of claim 11, wherein the obtaining the output layout information of the additional information comprises:

obtaining the output layout information of the additional information by inputting information related to the output layout of the main information and a remaining battery information of the device to the artificial intelligence model, wherein the artificial intelligence model is trained to output the output layout information corresponding to the remaining battery information from among a plurality of output layouts having different battery consumptions.

20. The method of claim 11, wherein the obtaining the output layout information of the additional information comprises obtaining, based on the device entering a standby mode, the output layout information of the additional information by inputting information related to the output layout of the main information and information on an estimated battery consumption in the standby mode to the artificial intelligence model, and wherein the artificial intelligence model is trained to output the output layout information corresponding to the estimated battery consumption from among a plurality of output layouts having different battery consumption.

* * * * *